J. C. BUTTERFIELD.
ANTISKIDDING ATTACHMENT.
APPLICATION FILED AUG. 16, 1912.
1,053,971.
Patented Feb. 25, 1913.
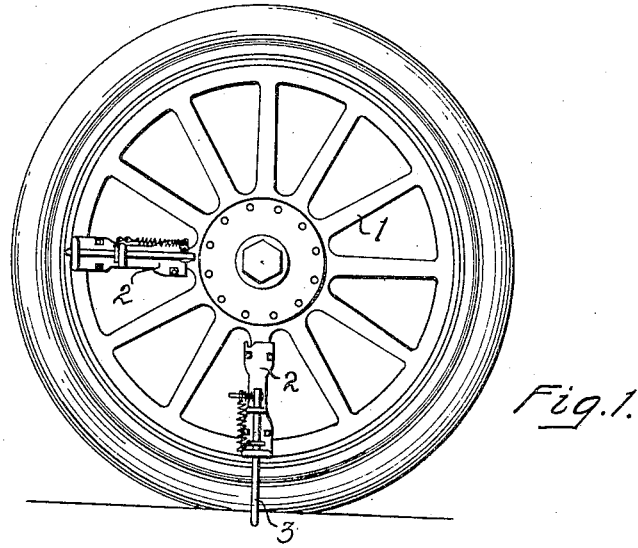
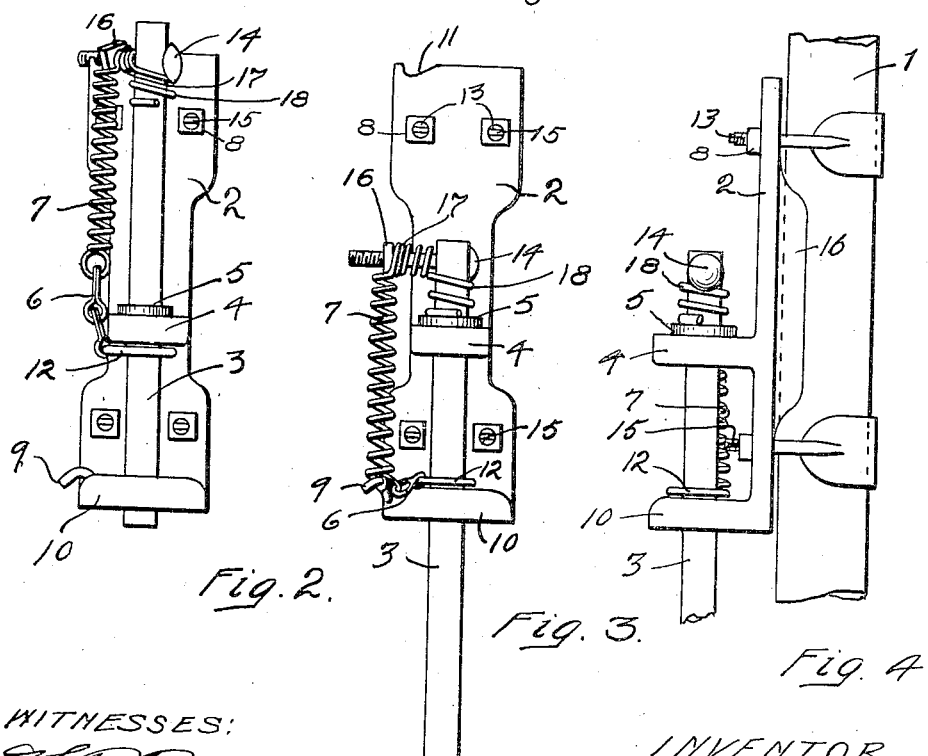
WITNESSES:
INVENTOR
John C. Butterfield.
by G. C. Kennedy,
ATTORNEY

UNITED STATES PATENT OFFICE.

JOHN CUSHING BUTTERFIELD, OF BELMOND, IOWA.

ANTISKIDDING ATTACHMENT.

1,053,971. Specification of Letters Patent. Patented Feb. 25, 1913.

Application filed August 16, 1912. Serial No. 715,433.

*To all whom it may concern:*

Be it known that I, JOHN CUSHING BUTTERFIELD, a citizen of the United States of America, and a resident of Belmond, Wright county, Iowa, have invented certain new and useful Improvements in Antiskidding Attachments, of which the following is a specification.

My invention relates to improvements in antiskidding attachments, and the object of my improvement is to provide an elastically connected and governed device adapted to be connected to a carrying-wheel and adapted to be placed in or out of an operative position relative to the wheel on which it is mounted, to engage the roadway or surface traversed, and prevent slipping or skidding thereover. This object I have accomplished by the means which are hereinafter described and claimed, and which are illustrated in the accompanying drawings, in which:

Figure 1 is a side elevation of an automobile wheel on which two of my improved antiskidding devices are mounted, one in its extended and operative position, and the other in its retracted position. Fig. 2 is an enlarged front elevation of one of said antiskidding attachments, and Fig. 3 is a similar view of same, the former in a retracted and the latter with an extended position of its slide-bar. Fig. 4 is a side elevation of the attachment shown in Fig. 3, with parts broken away.

Similar numerals of reference denote corresponding parts throughout the several views.

These antiskidding attachments are adapted to be removably secured to spokes of an automobile, traction or other carrying-wheel, and each comprises a base-plate or bar 2 having removable clips 13 inserted through orifices near its ends to have their U-shaped parts extend toward the wheel and embrace a spoke thereof, and being secured by nuts on the opposite side of the plate. The plate 2 has an end lug 10 and a medial transverse lug 4 on its outer face, both having bearing orifices in alinement to receive a slide-bar 3 therethrough. The lugs are long enough to permit the slide-bar 3 to play radially past one face of the wheel to whose spoke 1 the plate is attached, as shown best in said Fig. 1.

It is evident, that my attachment may be so located on a spoke, when desired or necessary, as when the device is employed on a traction-wheel having a broad tire, to have the outer end of its slidable-bar 3 pass movably through an orifice in the tire to engage the surface traversed, without departing from the principle or scope of my invention.

The inner end of the bar 3 is transversely orificed to receive a short bolt 14 having a nut 16 thereon. A small washer 17 is seated on said bolt between the nut 16 and the bar 3, and a coiled spring 18 is seated about the bar 3 and has a portion extended inwardly enough to be coiled two or three times about the bolt 8, which secures it in place. The washer 5 on the bar 3 serves as a seat for the spring 18. A coiled spring 7 is connected between the bolt 14 and a link 6, the latter connected to a ring 12 encircling the bar 3 between its lugs 4 and 10, slidably.

9 is a fixed hook on the side of the lug 10, and over which the link 6 may be engaged as shown in Fig. 3.

The nuts 8 are locked by means of wedges 15 driven into the split ends of the clips 13.

It will be seen, that when the nut 16 is engaged by the end of the spring 7, the latter being under tension by reason of its connection to the hook 9, said nut has one corner projected into the hollow end of the spring and is held there so that it may not work off the bolt 14.

Instead of a coiled spring 18 about the bar 3, other elastic bearing-means may be employed such as a rubber sleeve or washer, but I consider the spring preferable in practice.

As many of these attachments may be placed upon the spokes of a wheel as desired, but preferably there should be placed one on each alternate spoke for better results. When it is not desired to have the bar 3 extended, as when driving over a good pavement, the bar is to be pushed slidably through the lugs 4 and 10 and given a partial rotation, after first releasing the spring 7 from the hook 9, to bring the end of the bolt 14 over the end of the plate 2, where it becomes seated in a notch 11. The spring 7 then holds the bar with the bolt engaged in said notch, since the ring 12 still holds the spring under some tension, until it is desired to extend the bar, when the bolt may be disengaged from the notch, the spring re-connected to the hook 9, and the spring will react to throw the bar out to the extended position. When the bar 3 is extended it will project a short distance beyond the outer edge of the tire of the wheel, and sufficiently to penetrate the ground where it is rutty, or otherwise difficult to traverse, and give the wheel a good grip to enable it to move thereover without skidding or slipping. The same result obtains in passing over slippery or icy surfaces of pavements, since the ends of the bars 3 engage the surfaces passed over to prevent slipping, and in the case of moving over pavements, the bars will move inwardly somewhat against the tension of the compression springs 18, which will prevent damage to the pavement, while still allowing the devices to properly and efficiently engage the surface passed over. To disassemble the parts, the spring 7 may be unfastened from the hook 9, and then sprung in enough to permit its other end to slip away from the nut 16, to permit the nut to be removed.

The devices may have their frame-plates 2 made of aluminum which will not rust and have less weight than steel. They are inexpensive, easily applied or removed, and may be quickly adapted for extension or retraction as desired.

Having described my invention, what I claim as new, and desire to secure by Letters Patent, is:

1. An antiskidding attachment for automobile or other wheels, comprising a baseplate having means for securing it to a carrying-wheel, said plate having bearing-seats thereon, a bar slidably mounted in said seats, said bar having a pin projecting laterally to one side, engaging-means on said plate, and a tension-spring detachably connected between said pin and said engaging-means adapted to yieldingly project said bar beyond the tread of the wheel.

2. An antiskidding attachment for automobile or other wheels, comprising a baseplate having means for securing it to a carrying-wheel, said plate having bearing-seats thereon, a bar slidably mounted in said seats, said bar having a lateral projection, engaging-means on said plate, a tension-spring detachably secured between said projection and said engaging-means and adapted to yieldingly project one end of the bar beyond the tread of said wheel, and means for detachably securing said bar to said plate in a retracted position to not project beyond the tread of the wheel.

3. An antiskidding attachment for automobile or other wheels, comprising a baseplate having means for securing it to a carrying-wheel, said plate having bearing-seats thereon, a bar slidably mounted in said seats, said bar having a lateral projection, a compression-spring engaged between said projection and one of said seats, engaging-means upon the other of said seats, a tension-spring detachably connected between said engaging-means and the said projection, and said tension-spring being adapted to project the end of said bar beyond the outer line of tread of said wheel.

4. An antiskidding attachment for automobile or other wheels, comprising a baseplate having means for securing it to a carrying-wheel, said plate having bearing-seats thereon, a bar slidably seated in said seats, said bar having a transverse orifice through its inner end and a bolt seated therein to project laterally with a nut removably seated on its threaded outer end, engaging-means on one of said seats, a tension-spring detachably connected between said engaging-means and said bolt and adapted to yieldingly project said bar beyond the tread of the wheel, said nut so engaging the adjacent end of said spring as to be locked therewith.

5. An antiskidding attachment for automobile or other wheels, comprising a baseplate having means for securing it to a carrying-wheel, said plate having bearing-seats thereon, a bar slidably seated in said seats, said bar having a transverse orifice in its inner end with a bolt seated therein having a nut on its threaded outer end, a hook on the bearing-seat adjacent the outer end of said plate, a tension-spring detachably connected between said bolt-end and said hook, a compression-spring seated about said bar between said bolt and the adjacent bearing-seat and having one end coiled also about said bolt, and means for detachably securing said bolt to the inner end of said baseplate to hold said bar retracted upon the plate to have its outer end withdrawn within the line of tread of said wheel.

Signed at Waterloo, Iowa, this 29th day of July, 1912.

JOHN CUSHING BUTTERFIELD.

Witnesses:
WIRT P. HOXIE,
GEO. C. KENNEDY.

---

Copies of this patent may be obtained for five cents each, by addressing the "Commissioner of Patents, Washington, D. C."